(12) United States Patent
Lysik

(10) Patent No.: US 10,189,423 B2
(45) Date of Patent: Jan. 29, 2019

(54) WIRE HARNESS ROUTING AID

(71) Applicant: Ford Global Technologies, LLC, Dearborn, MI (US)

(72) Inventor: Kevin Lysik, Lathrup Village, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/469,280

(22) Filed: Mar. 24, 2017

(65) Prior Publication Data

US 2018/0272962 A1    Sep. 27, 2018

(51) Int. Cl.
| | | |
|---|---|---|
| *B60R 16/02* | (2006.01) | |
| *B29C 47/00* | (2006.01) | |
| *H01B 13/012* | (2006.01) | |
| *B29K 101/10* | (2006.01) | |

(52) U.S. Cl.
CPC ...... *B60R 16/0215* (2013.01); *B29C 47/0016* (2013.01); *B29C 47/0059* (2013.01); *H01B 13/01209* (2013.01); *B29K 2101/10* (2013.01)

(58) Field of Classification Search
CPC ............ B60R 16/0215; B29C 47/0016; B29C 47/0059; B29K 2101/10; H01B 13/01209
USPC ........................................................ 174/72 A
See application file for complete search history.

(56) References Cited

U.S. PATENT DOCUMENTS

| | | | | |
|---|---|---|---|---|
| 3,571,863 A | * | 3/1971 | Logan ................. | H01B 7/0045 174/72 A |
| 6,086,037 A | | 7/2000 | Nagy et al. | |
| 7,604,435 B2 | | 10/2009 | Mjelstad et al. | |
| 2004/0050580 A1 | * | 3/2004 | Hager ................. | G02B 6/4432 174/116 |
| 2009/0241331 A1 | | 10/2009 | Bedoe et al. | |
| 2010/0038011 A1 | | 2/2010 | Yoshinaga | |
| 2011/0275268 A1 | | 11/2011 | Harris et al. | |
| 2011/0280526 A1 | * | 11/2011 | Behziz ................. | H01B 7/0009 385/101 |
| 2013/0175079 A1 | * | 7/2013 | Adachi ............... | B60R 16/0215 174/350 |
| 2015/0122545 A1 | * | 5/2015 | Uchida ................ | H01B 7/0045 174/72 A |
| 2015/0357095 A1 | * | 12/2015 | Siripurapu ............ | H01B 11/04 174/99 R |

(Continued)

FOREIGN PATENT DOCUMENTS

| | | |
|---|---|---|
| CN | 2289327 Y | 8/1998 |
| CN | 202586239 U | 12/2012 |

(Continued)

OTHER PUBLICATIONS

Search Report dated Sep. 3, 2018 for GB Patent Application No. GB 1804461.0 (5 pages).

*Primary Examiner* — Timothy Thompson
*Assistant Examiner* — Michael F McAllister
(74) *Attorney, Agent, or Firm* — James P. Muraff; Neal, Gerber & Eisenberg LLP

(57) ABSTRACT

Method and apparatus are disclosed for a wire harness routing aid. An example wire harness routing aid for a vehicle includes an extruded core made of a thermosetting polymer. The example wire harness routing aid also includes a plurality of wires positioned around an exterior of the extruded core. Additionally, the wire harness routing aid includes a fastening layer to affix the plurality of wires to the extruded core.

13 Claims, 5 Drawing Sheets

(56) References Cited

U.S. PATENT DOCUMENTS

| | | | |
|---|---|---|---|
| 2016/0322792 A1* | 11/2016 | Dober | H02G 1/1253 |
| 2016/0362074 A1 | 12/2016 | Yamaguchi et al. | |
| 2017/0076837 A1* | 3/2017 | Yanazawa | B60R 16/0215 |
| 2017/0100913 A1* | 4/2017 | Uematsu | B32B 5/24 |
| 2017/0131496 A1* | 5/2017 | Blazer | G02B 6/443 |

FOREIGN PATENT DOCUMENTS

| | | |
|---|---|---|
| CN | 103012999 A | 4/2013 |
| DE | 19510401 A1 | 10/1995 |
| FR | 2580437 A1 | 10/1986 |
| JP | H 01183004 A | 7/1989 |
| JP | 3838474 B2 | 10/2006 |
| JP | 2009123635 A | 6/2009 |
| KR | 19980036318 U | 9/1998 |
| WO | WO 9735135 A1 | 9/1997 |

* cited by examiner

WIRE HARNESS ROUTING AID

TECHNICAL FIELD

The present disclosure generally relates to vehicle wiring systems and, more specifically, a wire harness routing aid.

BACKGROUND

Wire harnesses are bundles of cables that electrically couple components in a vehicle. Some cables are used for data communication (e.g., data buses) and some cables are used for power (e.g., power buses). Vehicles typically have tight spaces and close packaging envelopes in which the wire harness is to fit. As shown in FIG. 1, to ensure that the wire harness 100 fits within the allotted space, typically, the wire harness 100 is contained within a shield 102. The shield 102 is designed to fit into the allotted space. The shield 102 is produce via injection molding. However, injection molding requires a custom mold be designed for each location the shield 102 is being used. Designing and manufacturing the custom molds is time consuming and expensive.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a wire harness routing aid. An example wire harness routing aid for a vehicle includes an extruded core made of a thermosetting polymer. The example wire harness routing aid also includes a plurality of wires positioned around an exterior of the extruded core. Additionally, the wire harness routing aid includes a fastening layer to affix the plurality of wires to the extruded core.

An example wire harness for a vehicle includes a flexible portion and a rigid portion. The rigid portion includes an extruded core made of a thermosetting polymer affixed to wires of the wire harness An example method to create a wire harness routing aid for a vehicle includes extruding a core sized to fit within a close packaging envelope of a vehicle. The example method also includes placing the extruded core into a form to impart a shape of the close packaging envelope. Additionally, the example method includes curing the extruded core and attaching wires to the extruded core with a fastening layer.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
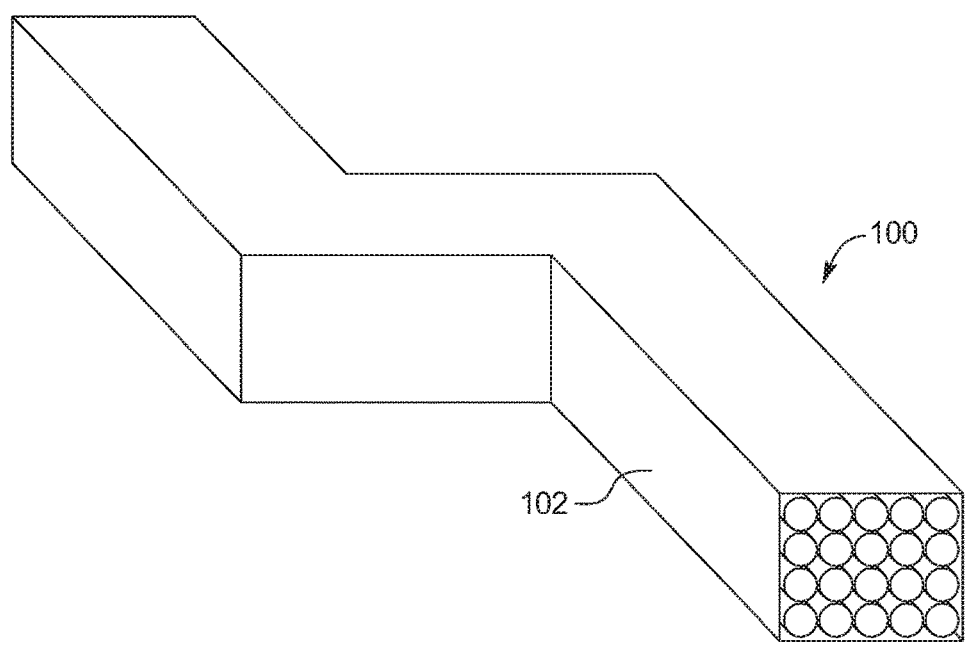
FIG. 1 illustrates a wire harness disposed within an injection molded shield.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

The wire harness routing aid provides a rigid structure for wires passing through a close packaging envelope defined by a body of a vehicle. The close packaging envelope are often in areas in the vehicle where a wire harness needs to pass through, but other design constraints limit the space in which the wire harness may reside and/or move around in. The wire harness routing aid of the present disclosure may be also used in appliances, machinery and other industrial uses, etc. Additionally, the wire harness routing aid may be used with other flexible transmission media, such as flexible pipes or hoses that are used to transport fluids and gas.

Figure 2:
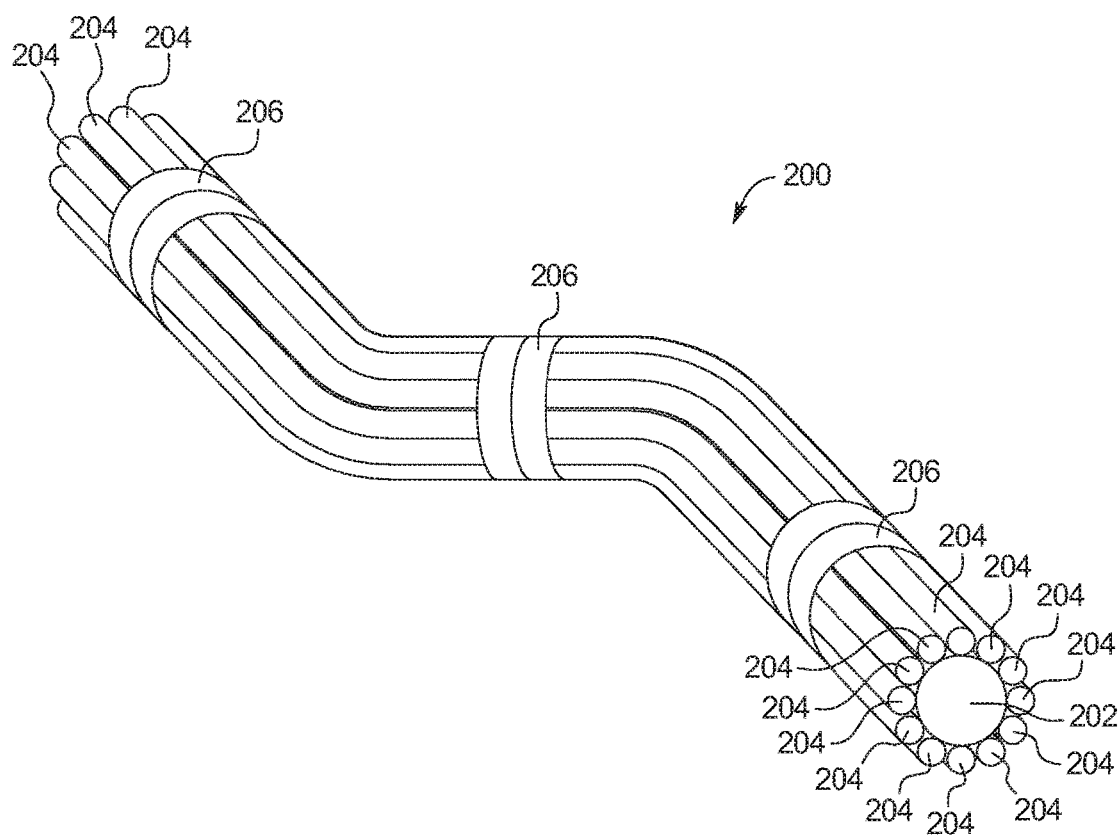
FIG. 2 illustrates a wire harness routing aid in accordance with the teachings of this disclosure.

FIG. 2 illustrates a wire harness routing aid 200 in accordance with the teachings of this disclosure. The wire harness routing aid 200 includes a core 202, wires 204, and fastening layer 206. The core 202 is made of a thermosetting polymer (sometimes referred to as a "thermoset composite"). The thermosetting polymer is selected to be semi-rigid, pliable, and non-breakable before it is set. For example, the core 202 may be thermoset polyester. To manufacture the core 202, the thermosetting polymer is extruded to have a cross-section suitable (e.g., a circle, an ovoid, a square, etc.) for the close packaging envelope in which the wire harness routing aid 200 is to fit. The core 202 is cured when it is in a shape to fit within the close packaging envelope in which the wire harness routing aid 200 is to fit. Because the core is pliable before being cured, it can be bent and/or curved to fit the shape of the close packaging envelope. For example, the close packaging envelope may have bends and/or curves. When the core 202 is in the desired shape, the core 202 is cured (e.g., via heat, via infrared radiation, etc.) to become rigid. In such a manner, the core 202 may be made in different sizes and shapes to allow for larger or smaller wire bundle diameters/sizes/cross-sections.

The wires 204 may be any suitable insulated wiring in any suitable gauge. The wires 204 may be in different gauges depending on the particular purpose of a wire. For example, wires associated with the power bus may be a smaller gauge compared to wires associated with one of the data buses. Wires that are run in one of the close packaging envelopes may be included in rigid portions of the wire harness and included in non-rigid portions (e.g. portions without the core 202) of the wire harness.

Figure 3:
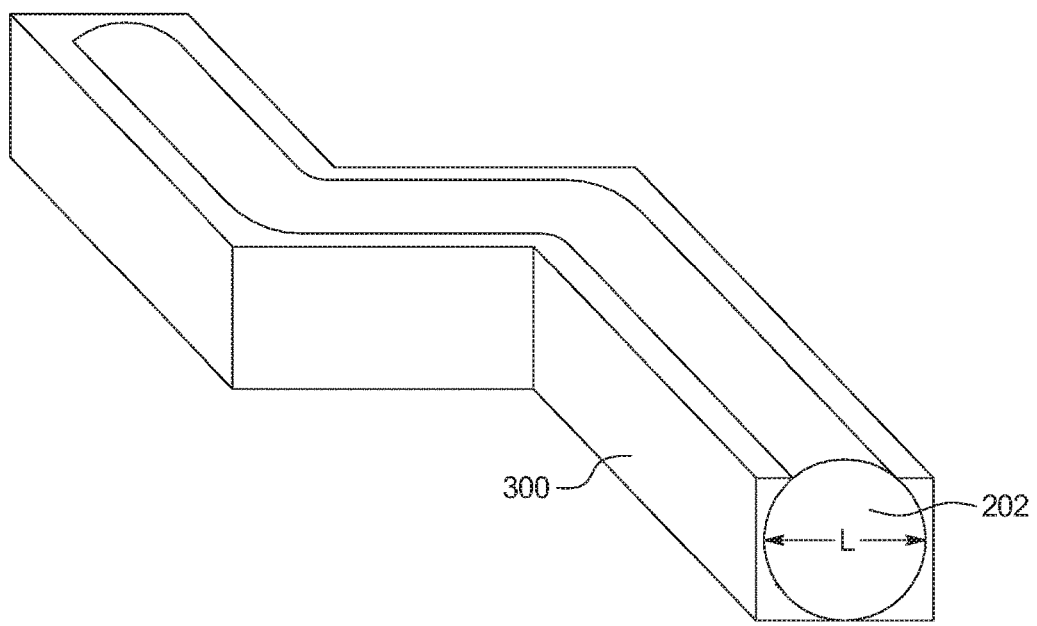
FIG. 3 illustrates a form for the wire harness routing aids of FIG. 2.

The fastening layer 206 affixes the wires 204 to the core 202. fastening layer 206 is a layer of material that at least partially covers the wires. In some examples, the fastening layer 206 is a tape designed for automotive and/or electrical uses (e.g. a vinyl-based tape, etc.). Alternatively, in some examples, the fastening layer 206 is a braided sleeve FIG. 3 illustrates a form 300 for the wire harness routing aid 200 of FIG. 2. The form 300 is shaped so the interior of the form 300 conforms to the shape of the close packaging envelope into which the wire harness routing aid 200 is to fit. In the illustrated example, the interior of the form 300 has a circular interior cross-section with a diameter d. Alternatively, in some examples, the interior of the form 300 may have any suitable interior cross-section. The form can be manufactured of any suitable material, such as aluminum, steel, plastic, or wood, etc. In some examples, the form 300 includes cutouts in the sides and bottom to allow for increased heat transfer during the curing process.

Figure 4:
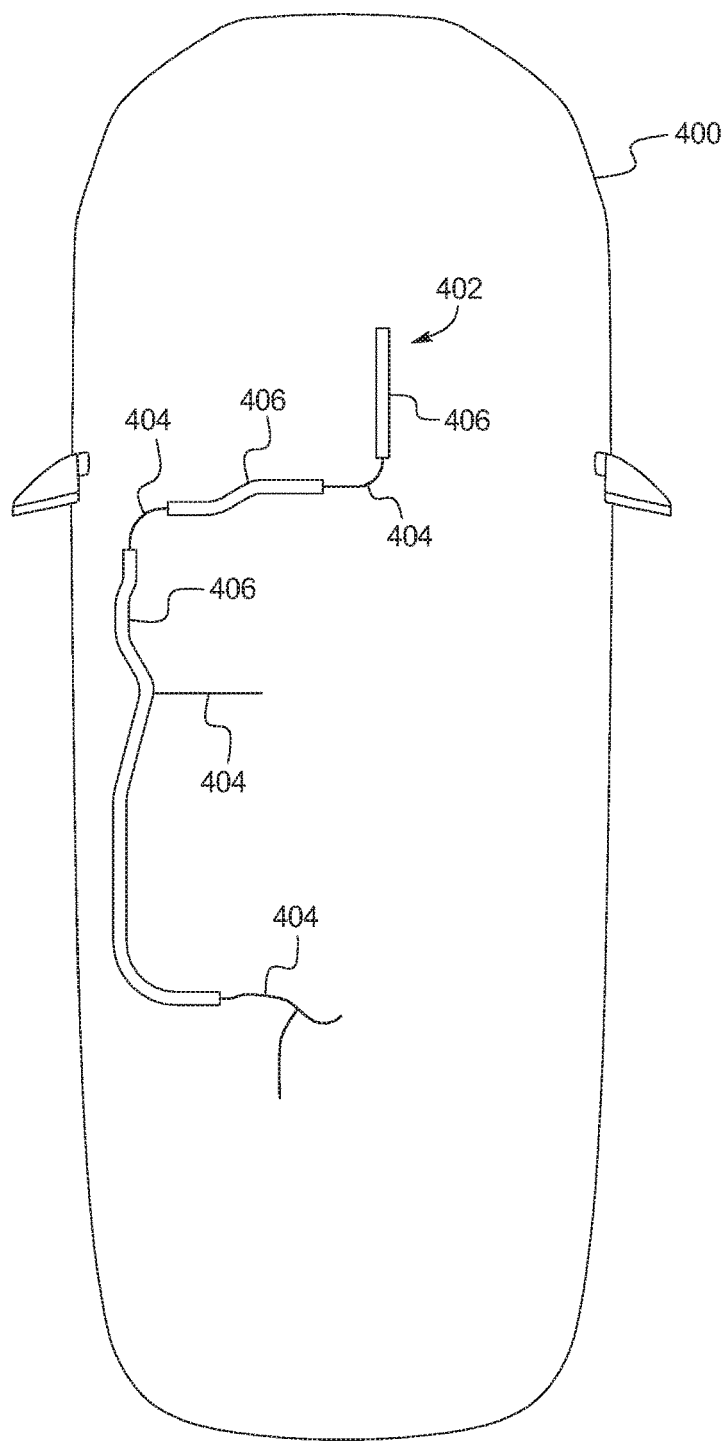
FIG. 4 illustrates a vehicle with a wire harness which includes the wire harness routing aids of FIG. 2.

FIG. 4 illustrates a vehicle 400 with a wire harness 402 which includes the wire harness routing aids 200 of FIG. 2. The vehicle 400 may be a standard gasoline powered vehicle, a hybrid vehicle, an electric vehicle, a fuel cell vehicle, and/or any other mobility implement type of vehicle. The vehicle 400 includes parts related to mobility, such as a powertrain with an engine, a transmission, a suspension, a driveshaft, and/or wheels, etc. The vehicle 400 may be non-autonomous, semi-autonomous (e.g., some routine motive functions controlled by the vehicle 400), or autonomous (e.g., motive functions are controlled by the vehicle 400 without direct driver input).

In the illustrated example, the wire harness 402 includes flexible portions 404 and rigid portions 406. The flexible portions 404 include the wires 204 and the fastening layer 206. The rigid portions 406 include the core 202, the wires 204 and, the fastening layer 206. In some examples, the fastening layer 206 of the flexible portions 404 is different than the fastening layer 206 of the rigid portions 406. For example, the fastening layer 206 of the flexible portions 404 may be the braided sleeve and the fastening layer 206 of the rigid portions 406 may be the electrical tape. The rigid portions 406 of the wire harness 402 fit into close packaging envelope defined by the body and or panels of the vehicle 400. For example, a close packaging envelope may be defined in the floor panel of the vehicle 400. Generally, the flexible portions 404 include connectors that connect the wire harness 402 to various vehicle components (e.g., electronic control units, lights, sound systems, etc.).

Figure 5:
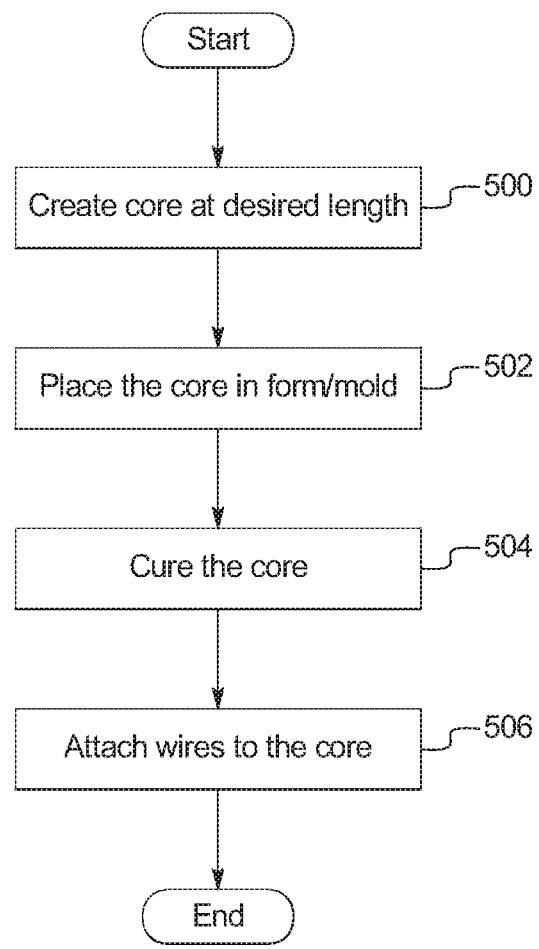
FIG. 5 is a flowchart of a process to create the wire harness routing aid of FIG. 2.

FIG. 5 is a flowchart of a process to create the wire harness routing aid 200 of FIG. 2. Initially, at step 500, the core 202 is created at with a desired length determined by the close packaging envelope in which the wire harness routing aid 200 will fit. To create the core 202, a thermosetting polymer is extruded to have a cross-section suitable (e.g., a circle, an ovoid, a square, etc.) for the close packaging envelope. At step 502, the extruded core 202 is placed into a form or mold (e.g., the form 300 of FIG. 3 below) while the extruded core 202 is pliable. The form or mold is designed to impart the shape of the close packaging envelope to the extruded core 202. Different forms or molds may be used depending on the location in the vehicle 400 in which the wire harness routing aid 200 is to fit. At step 504, the extruded core 202 is cured while in the form or mold. In some examples, the core 202 is cured via exposure to heat and/or infrared radiation. At step 506, after the core 202 is cured, the wires 204 are attached to the core 202 with the fastening layer 206. In some examples, this is performed when the wire harness 402 is being assembled.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A wire harness routing aid for a vehicle comprising:
   an extruded core made of a thermosetting polymer, wherein the extruded core is cured into a shape to fit within a close packaging envelope of the vehicle;
   a plurality of wires positioned around an exterior of the extruded core; and
   a fastening layer to affix the plurality of wires to the extruded core.

2. The wire harness routing aid of claim 1, wherein the shape has at least one curve.

3. The wire harness routing aid of claim 1, wherein the fastening layer is tape.

4. The wire harness routing aid of claim 1, wherein the fastening layer partially covers the plurality of wires along a length of the extruded core.

5. A wire harness for a vehicle comprising:
   a flexible portion;
   a rigid portion, the rigid portion including an extruded core made of a thermosetting polymer affixed to wires of the wire harness; and
   a first fastening layer and a second fastening layer, the first fastening layer bundling the wires in the flexible portion and the second fastening layer affixing the wires to the extruded core, the first fastening layer different from the second fastening layer.

6. The wire harness of claim 5, wherein the extruded core is cured into a shape to fit within a close packaging envelope of the vehicle.

7. The wire harness of claim 5, wherein the wires are positioned around an exterior of the extruded core.

8. The wire harness of claim 5, wherein the second fastening layer partially covers the wires along a length of the extruded core.

9. The wire harness of claim 5, wherein the rigid portion is a first rigid portion with a first extruded core, and wherein the wire harness includes a second rigid portion with a second extruded core made of the thermosetting polymer affixed to the wires of the wire harness.

10. The wire harness of claim 9, wherein the second extruded core is coupled to the first rigid portion via the flexible portion.

11. The wire harness of claim 9, wherein the second extruded core has a different shape than the first extruded core.

12. The wire harness of claim 11, wherein the second extruded core and the first extruded core each have at least one curved section.

13. A wire harness for a vehicle comprising:
a flexible portion;
a first rigid portion including a first extruded core made of a thermosetting polymer affixed to wires of the wire harness;
a second rigid portion with a second extruded core made of the thermosetting polymer affixed to the wires of the wire harness, the second rigid portion being coupled to the first rigid portion via the flexible portion.

* * * * *